Patented Nov. 29, 1938

2,138,540

UNITED STATES PATENT OFFICE 2,138,540

BUTYL ESTERS OF ALPHA, ALPHA-DIMETHYL-ALPHA'-CARBOXYDIHYDRO - GAMMA-PYRONE AND TO PROCESS FOR MAKING THE SAME

Jared H. Ford, Washington, D. C., assignor to Kilgore Development Corporation, Washington, D. C.

No Drawing. Application November 30, 1936, Serial No. 113,532

9 Claims. (Cl. 260—333)

This invention relates to a new group of compounds, the butyl esters of $\alpha,\alpha$-dimethyl-$\alpha'$-carboxydihydro-$\gamma$-pyrone, and to a process for making the same.

Each of the compounds forming the subject matter of this invention may be regarded as existing in two isomeric forms, the straight chain or enol form, and the ring or dihydropyrone form. In each case these isomers coexist in a dynamic equilibrium which may be represented by the formulae:

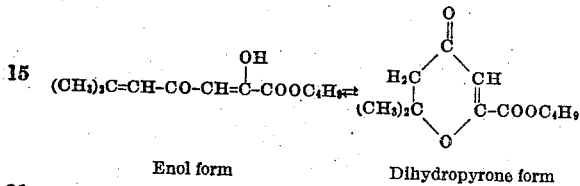

Enol form      Dihydropyrone form wherein, —$C_4H_9$ includes the normal, secondary, and isobutyl radicals.

By experimentation I have found that the dihydropyrone form predominates in the equilibrium mixture, and I have made solid derivatives of the dihydropyrone form for positive identification so that these esters may be regarded as dihydropyrones although it is to be understood that this nomenclature includes the dynamic equilibrium mixtures of the two isomers.

The members of this group of compounds are valuable as anti-oxidants, insecticides, and solvents for insecticides.

I have found that these compounds can be produced by condensing mesityl oxide with the respective dibutyl ester of oxalic acid using either metallic sodium or the corresponding sodium alkoxide as the condensing agent. By this procedure, the sodium salt of the enol form is produced which upon neutralization yields a mixture of the enol form and the corresponding dihydro-$\gamma$-pyrone as indicated in the above equilibrium. In each case approximately 90 percent of the mixture exists in the dihydropyrone form, and 10 percent as the enol isomer.

These new compounds are pale yellow, viscous liquids substantially insoluble in water, soluble in the usual organic solvents such as methyl and ethyl alcohols, acetone, chloroform, benzene, ether, kerosene, and the like.

I have prepared the normal, secondary and isobutyl esters by condensation reactions employing metallic sodium as well as by using the corresponding sodium alkoxide. The several examples, as will presently follow, show the procedure which I have used in each case.

I have also found by my researches that certain solvents are particularly suitable as media for effecting this condensation when metallic sodium is employed as the condensing agent. Those solvents which I have found to be most suitable for use as a medium in the metallic sodium type of condensation are benzene, toluene, xylene and tetrahydronaphthalene.

My experimentation has also developed the fact that any temperature may be used within a range from 30° C. to 100° C., but I prefer to employ a temperature of reaction of from 40° C. to 60° C. either by regulating the rate of addition of the reactants or by external cooling or both. The following examples are taken from my experiments. Only one ester is shown in each instance, but it is to be understood that every member of the group may be produced by the same procedure.

Example I

Preparation of $\alpha,\alpha$ - dimethyl - $\alpha'$ - carbo - n - butoxydihydro-$\gamma$-pyrone using sodium n-butoxide as the condensing agent.

Eleven and one-half grams of sodium was dissolved in 200 cc. of dry n-butyl alcohol. A mixture consisting of 54 grams of mesityl oxide and 101 grams of n-butyl oxalate was slowly added while the temperature of the reaction mixture was maintained within the range of from 40° C. to 45° C., by external cooling. In this manner a pasty suspension of the sodium salt of the enol form was obtained. This was diluted with 300 cc. of toluene and the mixture neutralized by agitation with cold 10 percent sulphuric acid. The washed toluene solution of the product was fractionally distilled under reduced pressure. Ninety-six grams of material boiling at 115–22° C./3 mm. was obtained. This product was an equilibrium mixture consisting predominantly of $\alpha,\alpha$ - dimethyl - $\alpha'$ - carbo - n - butoxydihydro - $\gamma$-pyrone, and the corresponding enol isomer thereof. The phenylhydrazone of this dihydropyrone melted at 151.5–2° C. (uncorrected).

Example II

Preparation of $\alpha,\alpha$ - dimethyl - $\alpha'$ - carbo - sec - butoxydihydro-$\gamma$-pyrone using metallic sodium as the condensing agent.

A mixture of 98 grams of mesityl oxide and 202 grams of sec-butyl oxalate was added to 500 cc. of dry benzene. 23 grams of metallic sodium was added at such a rate as to maintain a temperature between 40° C. and 55° C. with no external cooling. This benzene solution of the sodium enolate was neutralized, washed and fractionally distilled under reduced pressure. A yield of 149 grams of material was obtained boiling at 100–112.5° C./1–2 mm. and corresponding to 66 percent of the theoretical yield. This product was a mixture of α,α-dimethyl-α'-carbo-sec-butoxydihydro-γ-pyrone, and the enol isomer. The phenyl-hydrazone of this dihydropyrone was prepared having a melting point of 163–4° C. (uncorrected).

*Example III*

Preparation of α,α-dimethyl-α'-carbo-iso-butoxydihydro-γ-pyrone using metallic sodium.

Twenty-three grams of sodium was sliced and covered with 400 cc. of tetrahydronaphthalene. A mixture of 108 grams of mesityl oxide and 202 grams of iso-butyl oxalate was slowly added during the mixing of which the temperature was maintained at from 40° C. to 50° C. The tetrahydronaphthalene solution of the sodium enolate was neutralized with cold sulphuric acid, washed and fractionally distilled under reduced pressure. A yield of 154 grams of material was obtained boiling at 100–120° C./2 mm. and corresponding to 68 percent of the theoretical yield. The phenylhydrazone of this dihydropyrone was prepared and found to have a melting point of 161–2° C.

While I have in the above description and particularly in the examples, disclosed what I believe to be a preferred and practical process for obtaining the above described new group of compounds, it will be understood by those skilled in the art that the examples given are merely illustrative of ways in which these compounds may be obtained and are not to be construed as limiting the scope of the invention as claimed.

What I claim is:

1. As new chemical compounds, the group consisting of the normal, secondary and iso-butyl esters of α,α-dimethyl-α'-carboxydihydro-γ-pyrone.

2. Process of making the group of compounds consisting of the normal, secondary and iso-butyl esters of α,α-dimethyl-α'-carboxydihydro-γ-pyrone comprising condensing mesityl oxide with a dibutyl ester of oxalic acid by means of metallic sodium.

3. Process of making the group of compounds consisting of the normal, secondary and iso-butyl esters of α,α-dimethyl-α'-carboxydihydro-γ-pyrone comprising condensing mesityl oxide with the respective dibutyl ester of oxalic acid by means of metallic sodium, the condensation being conducted in an inert solvent wherein the sodium enolates are soluble under the conditions of the reaction.

4. Process of making the group of compounds consisting of the normal, secondary and iso-butyl esters of α,α-dimethyl-α'-carboxydihydro-γ-pyrone comprising condensing mesityl oxide with the respective dibutyl ester of oxalic acid by means of metallic sodium in a solvent selected from the group consisting of benzene, toluene, xylene, and tetrahydronaphthalene.

5. Process of making the group of compounds consisting of the normal, secondary and iso-butyl esters of α,α-dimethyl-α'-carboxydihydro-γ-pyrone comprising condensing mesityl oxide with a dibutyl ester of oxalic acid by means of metallic sodium, the reaction being carried out at a temperature within a range of from 30° C. to 100° C.

6. Process of making the group of compounds consisting of the normal, secondary and iso-butyl esters of α,α-dimethyl-α'-carboxydihydro-γ-pyrone comprising condensing mesityl oxide with a dibutyl ester of oxalic acid by means of metallic sodium in a solvent selected from the group consisting of benzene, toluene, xylene, and tetrahydronaphthalene, the reaction being carried out at a temperature within a range of from 30° C. to 100° C.

7. Process of making the group of compounds consisting of the normal, secondary and iso-butyl esters of α,α-dimethyl-α'-carboxydihydro-γ-pyrone comprising condensing mesityl oxide with a dibutyl ester of oxalic acid by means of the corresponding sodium alkoxide selected from the group consisting of sodium n-butoxide, sodium isobutoxide, sodium sec-butoxide.

8. Process of making the group of compounds consisting of the normal, secondary and iso-butyl esters of α,α-dimethyl-α'-carboxydihydro-γ-pyrone comprising the condensation of mesityl oxide with the respective dibutyl ester of oxalic acid by means of the corresponding sodium butoxide, the same being conducted in solvent consisting of the corresponding butyl alcohol.

9. The normal-, secondary-, and iso-butyl esters produced by condensing mesityl oxide with the corresponding dibutyl esters of oxalic acid by means of a condensing agent selected from the group consisting of metallic sodium and the corresponding sodium butoxides.

JARED H. FORD.